United States Patent
Bui et al.

(10) Patent No.: US 10,129,763 B1
(45) Date of Patent: Nov. 13, 2018

(54) METHOD AND SYSTEM FOR CONTROLLING RADIO FREQUENCY INTERFERENCE TO PUBLIC SAFETY COMMUNICATION

(71) Applicant: Sprint Spectrum L.P., Overland Park, KS (US)

(72) Inventors: Hung Bui, Chantilly, VA (US); Hadeel Fayad, Washington, DC (US); Robert Kingsley, Ashburn, VA (US); Masayoshi Son, Tokyo (JP)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/478,851

(22) Filed: Apr. 4, 2017

(51) Int. Cl.
| | |
|---|---|
| *H04W 72/00* | (2009.01) |
| *H04M 1/00* | (2006.01) |
| *H04W 16/28* | (2009.01) |
| *H04W 72/08* | (2009.01) |
| *H04W 72/04* | (2009.01) |
| *H04W 4/90* | (2018.01) |
| *H04L 5/00* | (2006.01) |

(52) U.S. Cl.
CPC ............ *H04W 16/28* (2013.01); *H04W 4/90* (2018.02); *H04W 72/0413* (2013.01); *H04W 72/082* (2013.01); *H04L 5/0062* (2013.01)

(58) Field of Classification Search
CPC ..... H04W 72/04; H04W 16/12; H04W 24/00; H04W 28/08; H04W 16/14; H04W 88/08; H04W 16/28

USPC .......... 455/450–451, 452.1–452.2, 453–454, 455/561, 562.1
See application file for complete search history.

(56) References Cited

U.S. PATENT DOCUMENTS

| | | | |
|---|---|---|---|
| 8,520,544 B2 | 8/2013 | Aguirre et al. | |
| 8,570,883 B1 | 10/2013 | Khanka et al. | |
| 8,890,757 B1 * | 11/2014 | Macy ................... | H01Q 1/125 343/713 |
| 9,374,721 B1 | 6/2016 | Bales et al. | |
| 9,479,885 B1 * | 10/2016 | Ivanov ................. | H04R 29/005 |
| 2005/0250542 A1 * | 11/2005 | Aoyama ............... | H01Q 1/125 455/562.1 |
| 2006/0158369 A1 * | 7/2006 | Shinoda ............... | G01S 7/2925 342/70 |
| 2013/0052985 A1 * | 2/2013 | Tujkovic .............. | H04W 4/22 455/404.2 |
| 2013/0101073 A1 * | 4/2013 | Zai ........................ | G01S 7/023 375/349 |
| 2013/0171955 A1 | 7/2013 | Makhlouf et al. | |

(Continued)

*Primary Examiner* — Anthony S Addy
*Assistant Examiner* — Matthew W Genack

(57) ABSTRACT

A cellular base station and/or associated equipment will detect the presence of nearby public safety communication and, in response, will automatically change the base station's antenna beam pattern to be directed to a predefined safe direction, so as to quickly minimize the likelihood of the base station producing harmful interference to the public safety communication. Further, after thus quickly working to minimize the likelihood of such interference, the base station and/or associated equipment could then more specifically determine a direction from which the public safety communication is arriving and could further adjust the base station's antenna beam pattern to be directed away from the determined direction.

20 Claims, 5 Drawing Sheets

(56) References Cited

U.S. PATENT DOCUMENTS

| | | | |
|---|---|---|---|
| 2013/0331114 A1* | 12/2013 | Gormley | H04W 72/082 455/452.1 |
| 2014/0287704 A1* | 9/2014 | Dupuy | H04B 1/0475 455/114.2 |
| 2015/0092552 A1* | 4/2015 | Bajj | H04W 28/08 370/235 |
| 2015/0148088 A1 | 5/2015 | Ericson | |

* cited by examiner

METHOD AND SYSTEM FOR CONTROLLING RADIO FREQUENCY INTERFERENCE TO PUBLIC SAFETY COMMUNICATION

BACKGROUND

A typical cellular wireless system includes a number of base stations each radiating to provide coverage in which to serve wireless client devices (WCDs) such as cell phones, tablet computers, tracking devices, embedded wireless modules, and other wirelessly equipped devices. In turn, each base station may sit as a node on a core access network that includes entities such as a network controller and a gateway system that provides connectivity with an external transport network such as the Public Switched Telephone Network (PSTN) or the Internet. With this arrangement, a WCD within coverage of the system may engage in air interface communication with a base station and may thereby communicate via the base station with various remote network entities or with other WCDs served by the base station.

Such a system may operate in accordance with a particular air interface protocol, examples of which include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), Global System for Mobile Communications (GSM), IEEE 802.11 (WIFI), BLUETOOTH, and others.

In accordance with the air interface protocol, a base station may provide service on one or more carriers, each spanning particular radio-frequency on which communications can flow wirelessly between the base station and WCDs. Such a carrier could be structured to provide a downlink for carrying communications from the base station to WCDs and an uplink for carrying communications from WCDs to the base station.

OVERVIEW

In practice, the operator of a cellular wireless system may acquire a license for use of specific frequency ranges by the system and may configure its base stations to provide service on carriers defined in those frequency ranges. In the United States, for instance, the Federal Communication Commission is responsible for managing and licensing electromagnetic spectrum for commercial and non-commercial uses. Thus, the operator of a cellular wireless system may acquire a spectrum license from the FCC and may configure its base stations to operate on the licensed spectrum.

While such a license may allow for liberal use of the licensed spectrum to provide cellular wireless service, certain restrictions apply. One restriction of note is the need to avoid harmful interference to public safety radio systems, such as those used by police, firefighters, emergency medical technicians, and other first responders.

With current spectrum licensing in the United States, for example, this becomes an issue in and around the 800 MHz band, where the FCC has licensed a block of spectrum for public safety downlink communication and the FCC has also licensed an adjacent block of spectrum for commercial cellular wireless downlink communication. With such an arrangement, there is at least a risk that downlink transmissions from cellular wireless base stations could interfere with reception of important public safety communications by nearby first responder radio units, due to imperfect filter roll-off, out-of-band emissions, or the like.

This interference problem is most likely to impact first responder devices that are located within relatively close range of the cellular base station, such as within a 150 meter radius for instance. Fortunately, in some cellular network deployments, this may therefore not pose much of an issue, since macro cellular wireless base stations that would transmit with high power are typically located far enough away from streets and other areas where first responder devices would likely be used. Unfortunately, however, newer cellular network deployments may pose more of an issue.

As a cellular operator seeks to improve wireless coverage, particularly in urban areas, the operator may deploy small-cell base stations at locations that are closer to where first responder devices would likely be used. For example, the cellular operator may install small-cell base stations on utility poles directly adjacent to streets or other areas where first responder devices are likely to operate. With such an arrangement, in order to avoid to interference with downlink public safety communications, the cellular operator may need to significantly reduce transmission power by such base stations. Yet significantly reducing base station transmission power could defeat the purpose of deploying the base stations in the first place. Therefore, a better solution is desired.

Disclosed herein is an improved method and system. In accordance with the disclosure, a cellular base station or associated equipment will detect when a public safety first responder device is engaging in communication near the base station and, in response, will automatically change the base station's antenna beam pattern to be directed to a predefined safe direction, so as to quickly minimize the likelihood of the base station producing harmful interference at the first responder device.

Optimally, the predefined safe direction could be preconfigured without having advanced knowledge of the actual location of the first responder device or direction of the first responder device from the base station. For instance, the base station or associated equipment could be pre-provisioned with an indication of the predefined safe direction as the direction to which the base station's beam pattern should then be automatically changed whenever the base station or associated equipment detects that a public safety first responder device is engaging in communication near the base station. Thus, once the base station or associated equipment detects communication by a public safety first responder device, the base station or associated equipment could automatically change the base station's beam pattern to be directed to the predefined safe direction without having determined a direction from which the detected communication came.

In this process, the predefined safe direction can be a direction that is away from an area where first responders are likely to be located, or the predefined safe direction could be a direction that is where first responders are likely to not be located. For example, for a small cell base station that is positioned directly adjacent to a street, where first responder devices are likely to be located on the street, the predefined safe direction could be a direction pointed directly away from the street. As another example, for a base station that is positioned at a raised height (e.g., on top of a utility pole or tower) and that has a down-tilted beam pattern for providing ground-level coverage, where first responder devices are likely to be located at ground level, the predefined safe direction could be a less down-tilted direction (i.e., a direction that is pointed more toward the horizon). Other examples are possible as well.

In practice, the act of automatically changing the base station's beam pattern to be directed to a predefined safe direction could thus take various forms. For example, the automatic changing could involve increasing the elevation (reducing a downtilt) of the beam pattern. And as another example, if the beam pattern is directional (rather than omnidirectional), the automatic changing could involve changing an azimuth of the beam pattern to be pointed in the safe direction. Further, the act of automatically changing the base station's beam pattern to be directed to the predefined safe direction could equally involve automatically changing the base station's beam pattern to be directed away from a predefined unsafe direction, thus effectively being directed instead to a predefined safe direction. For example, the automatic changing could involve introducing one or more beam-pattern nulls in the unsafe direction, or changing the elevation and/or azimuth of the beam pattern to be pointed away from the unsafe direction.

Further, in accordance with the disclosure, once the base station's antenna beam pattern is automatically changed to be directed to the predefined safe direction, the base station or associated equipment could then proceed to refine the beam pattern direction based on an evaluation of where the first responder device is located. In particular, the base station or associated equipment could then scan at various directions to determine a direction from which the public safety communication is coming. And if the base station's beam pattern is then not already directed away from the determined direction, the base station or associated equipment could then further change the base station's beam pattern to be directed away from that determined direction, so as to help further minimize the likelihood of the base station producing harmful interference at the first responder device.

Still further, after changing the base station's beam pattern to help minimize the likelihood of harmful interference, the base station or associated equipment can then continue to monitor for the presence of public safety communication. And upon detecting the absence of further public safety communication, the base station or associated equipment can then automatically revert the base station's beam pattern to its initial, default configuration.

Accordingly, in one respect, disclosed is an example method for controlling radio frequency interference from a cellular base station to public safety communication, wherein the base station is configured to provide an antenna beam pattern. In accordance with the disclosure, the method includes monitoring at the base station (e.g., by a sniffer module co-located with the base station) a public safety frequency channel and, based on the monitoring, detecting communication on the public safety frequency channel. And the method then includes, responsive to the detecting, automatically changing the antenna beam pattern of the base station to be directed to a predefined safe direction, with the predefined safe direction having been established before detecting the communication on the public safety frequency channel.

Further, in another respect, disclosed is an example system for controlling radio frequency interference to public safety communication. The system comprises a cellular base station including a first antenna structure and a first radio, the cellular base station being configured to provide an antenna beam pattern for downlink cellular wireless communication service on a cellular wireless frequency channel. Further, the system comprise a sniffer unit co-located with the cellular base station, the sniffer unit including a second antenna structure and a second radio, with the sniffer unit being configured to receive on a public safety frequency channel, to detect communication on the public safety frequency channel, and to output a control signal to the cellular base station upon detecting the communication on the public safety frequency channel. And the base station is configured to respond to the control signal from the sniffer unit by automatically changing the beam pattern of the base station antenna structure to be directed to a predefined safe direction, wherein the predefined safe direction is established before detecting of the communication on the public safety frequency channel.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
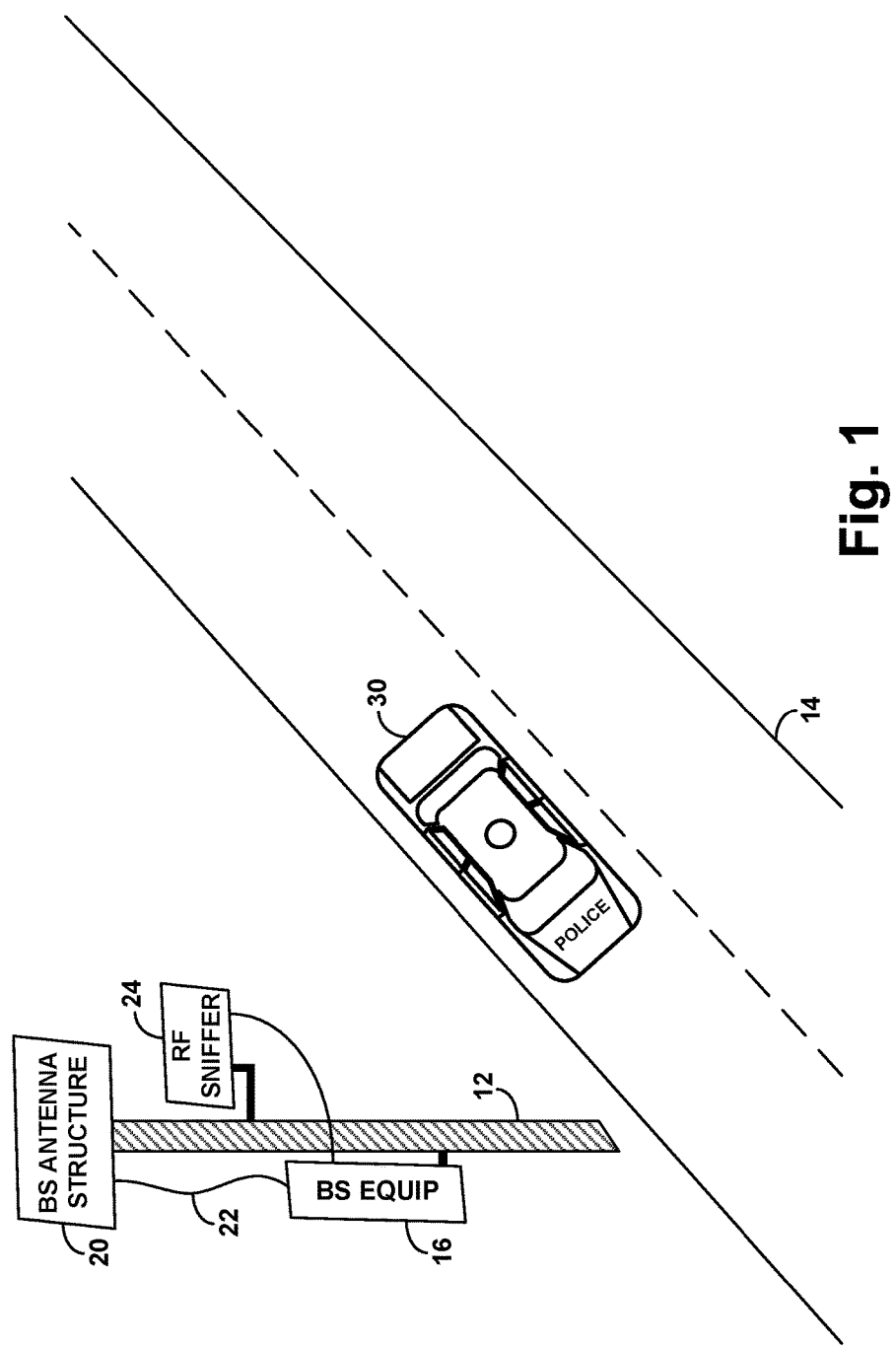
FIG. 1 is a depiction of an example scenario in which features of the present disclosure can be implemented.

The present method and system will be described by way of example with respect to a scenario where a base station is installed on a utility pole directly adjacent to a street and where, upon detecting public safety communication, the base station's antenna beam pattern is automatically changed to reduce or avoid transmission on the street. As explained above, this example could help address the likely scenario where a public safety first responder device is located on the street, for instance in a police car, firetruck, or ambulance. It should be understood, however, that features of the method and system can be applied as well in numerous other scenarios. For instance, the method and system could be applied where the base station is deployed or integrated elsewhere and where the antenna beam pattern is automatically changed to a different predefined safe direction upon detecting nearby public safety communication.

Referring to the drawings, as noted above, FIG. 1 is a graphical depiction of an example scenario where a utility pole 12 is situated directly adjacent to a street 14. In practice, the utility pole could take various forms, including but not limited to a light pole, a telephone pole, an electrical pole, a cellular service pole, or variants including a tower or other structure. Likewise, the street could take various forms, including a local roadway, highway, or other vehicular passageway.

In the example scenario, a cellular base station is installed on the utility pole 12 and is configured to provide cellular wireless coverage over an area at least including a portion of the street 14. In a representative implementation, the cellular base station is a small-cell base station, perhaps a relay base station (also referred to as a "mini-macro") having wireless backhaul connectivity with a cellular operator's core network (not shown). Further, the base station is configured to serve WCDs that are situated within its coverage.

The example cellular base station includes a combined radio head and baseband unit (not individually shown) housed within a base station equipment unit 16 attached to the utility pole 12 and coupled with a power source (not shown). And the base station then further includes a base station antenna structure 20 optimally attached at or near a top of the utility pole to help provide broad cellular coverage. In practice, the base station is configured to provide coverage on a cellular frequency channel, and thus to provide at least downlink cellular transmission on that frequency channel. For instance, the base station could be configured to provide coverage on an LTE carrier at the low-frequency end of LTE band-class-26 (BC26), with a downlink channel having a bandwidth of 5 MHz and starting at 862 MHz.

In a representative implementation, the baseband unit includes a backhaul communication module (not shown) for interfacing with the operator's core network. For instance, backhaul module could include a WCD module configured to be served by a donor base station situated on the core network so as to provide wireless relay backhaul connectivity. Or the backhaul module could be connected by a cable connection or other means with the core network. Further, the baseband unit includes one or more channel cards configured with logic modules (e.g., circuitry and/or one or more programmed processing units) to provide baseband unit functionality such as encoding/decoding downlink and uplink cellular communications.

The radio head is then coupled with the baseband unit and includes a number of antenna ports (e.g., mini-DIN ports) for coupling the radio head by an radio frequency (RF) transmission medium 22 such as one or more coaxial cables with the main base station antenna structure 20. Further, the radio head or baseband unit may include a power amplifier for amplifying downlink communications for transmission via the main base station antenna structure 20.

The base station antenna structure 20 could then take various forms, configured to provide an antenna beam pattern defining downlink coverage of the base station. By way of example, the base station antenna structure could be a phased array antenna structure or the like, configured to provide omnidirectional coverage, with a beam pattern that is largely 360 degrees around the utility pole and an elevation defining a down-tilt to provide coverage at ground-level. And as another example, the base station antenna structure could be a panel antenna, also possibly phased array, or other sort of antenna structure configured to provide a more directional beam pattern having an azimuth defining a radial direction of coverage and an elevation similarly defining a down-tilt to provide coverage at ground level.

With this arrangement, when the baseband unit receives or generates data to be transmitted by the main base station antenna structure 20, the baseband unit could apply its logic to encode the data, such as by applying constellation coding or the like to produce code symbols (e.g., I and Q symbols) representing the data, and the baseband unit could then pass the resulting symbols to the radio head. And the radio head may could modulate the symbols onto an RF carrier and transmit the RF carrier to the antenna structure for wireless transmission in the base station's coverage area.

Optimally, the base station antenna structure 20 is programmatically controllable to vary its beam pattern. For instance, if the antenna structure is a phased array antenna structure, it could be controllable to change its beam pattern (e.g., azimuth and/or elevation) by changing phases and amplitudes of various antenna elements of the phased array. Alternatively, the antenna structure could be controllably rotated or tilted to change its azimuth and/or elevation (e.g., down-tilt). Further, the antenna structure beam pattern could be controllably changed to introduce one or more beam pattern nulls in particular directions, so as to effectively direct the beam pattern away from such directions by causing the beam pattern to not be directed in such directions.

For example, the base station antenna structure could have a remote control interface through which the antenna structure is configured to receive and respond to control signals to make beam pattern changes, such as to make specific changes to elevation or azimuth, or to introduce nulls in specific directions or make other particular changes to the base station antenna beam pattern. The base station's radio head and/or baseband unit could then be configured to send such control signals to the base station antenna structure so as to cause particular changes to be made to the base station's antenna beam pattern, such as to cause the beam pattern be directed in a safe direction or more specifically in a direction away from where public safety communication is likely to be occurring.

In the arrangement of FIG. 1, also installed on the utility pole is an RF sniffer 24, which is configured to detect public safety communication on a public safety frequency channel and to responsively signal to the base station to trigger associated changing of the base station's beam pattern. As shown, the RF sniffer 24 may be provided as a separate equipment unit on the utility pole. Alternatively, portions of the RF sniffer could be integrated with the base station equipment unit 16.

In the example implementation, the RF sniffer 24 includes a sniffer antenna arrangement and associated sniffer radio and control unit (not individually shown), also coupled with power source 18 or the like. The RF sniffer operates to monitor a public safety frequency channel, so as to detect when public safety communication occurs on that channel. To facilitate this, the sniffer radio could include an RF band-pass filter tuned to receive on the public safety frequency range. And the sniffer control unit and/or radio could regularly measure the energy level on the public safety frequency channel to determine when the energy level is at least as high as a predefined threshold energy level (e.g., a threshold extent above a noise floor) that is deemed to represent likely active communication on the channel. (Further, the sniffer control unit could be configured to detect specific public safety communications as indicative of the presence of public safety communication.) And upon thereby detecting public safety communication, the RF sniffer could output a control signal to the base station to trigger a change of the base station's antenna beam pattern.

In practice, the sniffer antenna structure could take various forms, optimally configured to receive on the public safety frequency channel at various directions around the utility pole (and at least at a direction from which public safety communication is likely to be detected, such as in the direction of the street 14 for instance). By way of example, the sniffer antenna structure could include a phased array antenna structure that provides an omnidirectional beam pattern around the utility pole and an elevation defining a down-tilt so that the sniffer can receive communications originating at ground level. Alternatively, the sniffer antenna structure could include a narrow beam antenna structure (also possibly phased array) that is programmatically or mechanically steerable to various directions around the utility pole, perhaps under the control of the RF sniffer control unit or other equipment.

Although the RF sniffer is co-located with the base station as both are installed at or on the same utility pole or the like, the sniffer (at least the sniffer antenna structure) could optimally be spatially separated from the base station antenna structure as shown. This spatial separation can help avoid having downlink transmissions from the cellular antenna structure overpower signals received by the sniffer antenna structure, and can thus help better facilitate detecting when public safety communication occurs on the public safety communication channel.

Further the sniffer antenna structure could also be separated slightly from the utility pole but still effectively co-located with the base station, by being installed on an extension platform or other mechanism, to help minimize RF obstruction by the pole itself. Alternatively, the sniffer antenna structure could be wrapped around the pole or otherwise configured to help allow for more complete omni-directional monitoring for communication on the public safety frequency channel.

With the example arrangement shown in FIG. 1, the base station may initially operate with a default antenna beam pattern established by engineering design and configuration of the base station. As noted above, this beam pattern could be omnidirectional or could be directional, at least providing coverage on the adjacent street.

Further, the base station could be configured, also by engineering input, with an indication of a predefined safe direction to which the base station's beam pattern would be automatically changed to be directed if and when the RF sniffer detects public safety communication on the public safety frequency channel, or likewise with an indication of a predefined unsafe direction away from which the base station's antenna beam pattern could be automatically directed if and when the RF sniffer detects public safety communication on the public safety frequency channel. (As such, the predefined safe direction is established in advance of detecting the public safety communication.) For instance, the base station baseband unit or radio head could be configured with control signal parameters that could be sent to the base station antenna structure to effect a change of its beam pattern so as to be directed to the predefined safe direction.

In practice, the predefined safe direction could be a predefined elevation that has reduced down-tilt compared with the base station's default antenna beam pattern, such as an elevation that has anywhere in the range of three to ninety degrees less down-tilt. Alternatively or additionally, the predefined safe direction could be a predefined azimuth, such as an azimuth that points away from the adjacent street. And a predefined unsafe direction could be an azimuth and/or elevation pointing in the direction of the street or other location where public safety first responder devices are likely to be located.

FIG. 1 further depicts an example public safety first responder vehicle 30 on street 14, perhaps moving on the street or attending to an emergency situation on the street. In practice, this vehicle may contain a public safety first responder device operated by a first responder to engage in communication on the public safety frequency channel. As noted above, a downlink of the public safety communication channel could be adjacent to if not partially overlapping the downlink of the cellular wireless frequency channel. For instance, the public safety frequency channel could have a downlink (e.g., for communication to first responder devices) of 854 MHz to 860 MHz, which would be adjacent to the cellular wireless downlink that begins at 862 MHz. Further, the public safety frequency channel could have an uplink (e.g., for communication from first responder devices) of 809 MHz to 815 MHz.

As discussed above, a potential problem with this arrangement is that downlink transmission from the cellular base station could create harmful interference at the public safety first responder device. This could occur due to imperfections in the first responder device receiver, given out of band emissions from the cellular base station, or for other reasons. And this could be a particular issue in the example scenario where the base station's antenna beam pattern is configured to provide coverage at least on the street, where the example first responder device happens to be located.

In accordance with the present disclosure, the RF sniffer will regularly monitor the public safety frequency channel as noted above to detect when the energy level on that channel is sufficiently high to indicate the presence of public safety communication on the channel. In particular, the RF sniffer could be configured to regularly monitor the uplink public safety frequency channel (e.g., 809 MHz to 815 MHz), as that is the channel on which a nearby first responder device may be transmitting. Upon detecting threshold high energy level on that channel, the RF sniffer could then output a control signal to the base station as discussed above, and the base station could respond by automatically changing its antenna beam pattern to be directed to the predefined safe direction (e.g., to be directed away from the predefined unsafe direction).

Figure 2:
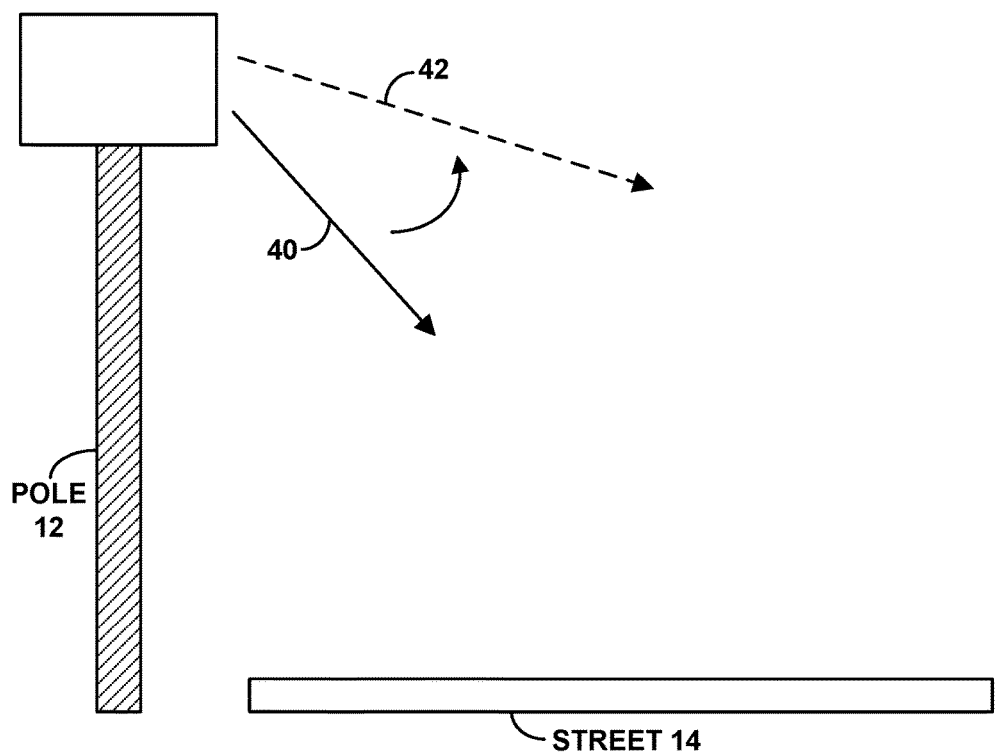
FIG. 2 is a depiction of an example change in base station antenna beam pattern to be directed to a predefined safe direction in response to detected public safety communication.
Figure 3:
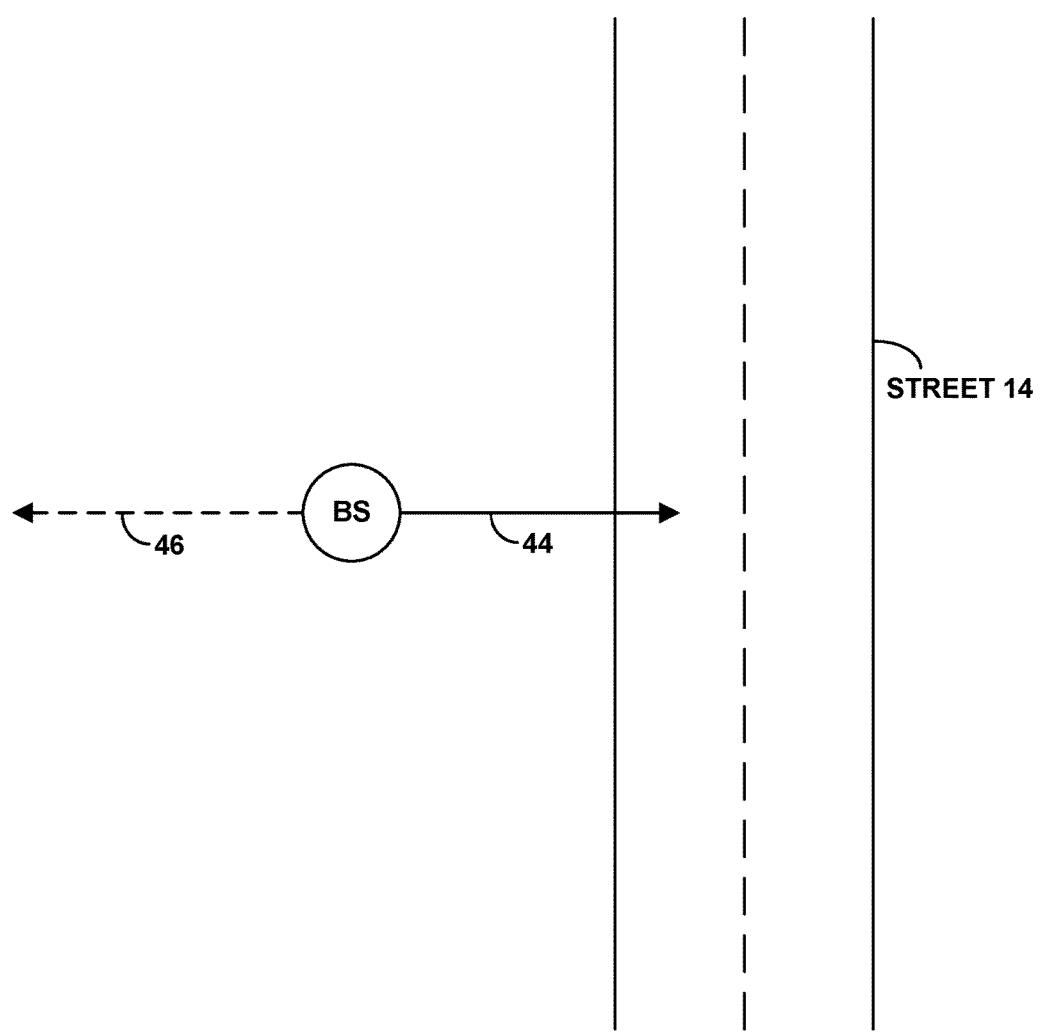
FIG. 3 is another depiction of an example change in base station antenna beam pattern to be directed to a predefined safe direction in response to detected public safety communication.
Figure 4:
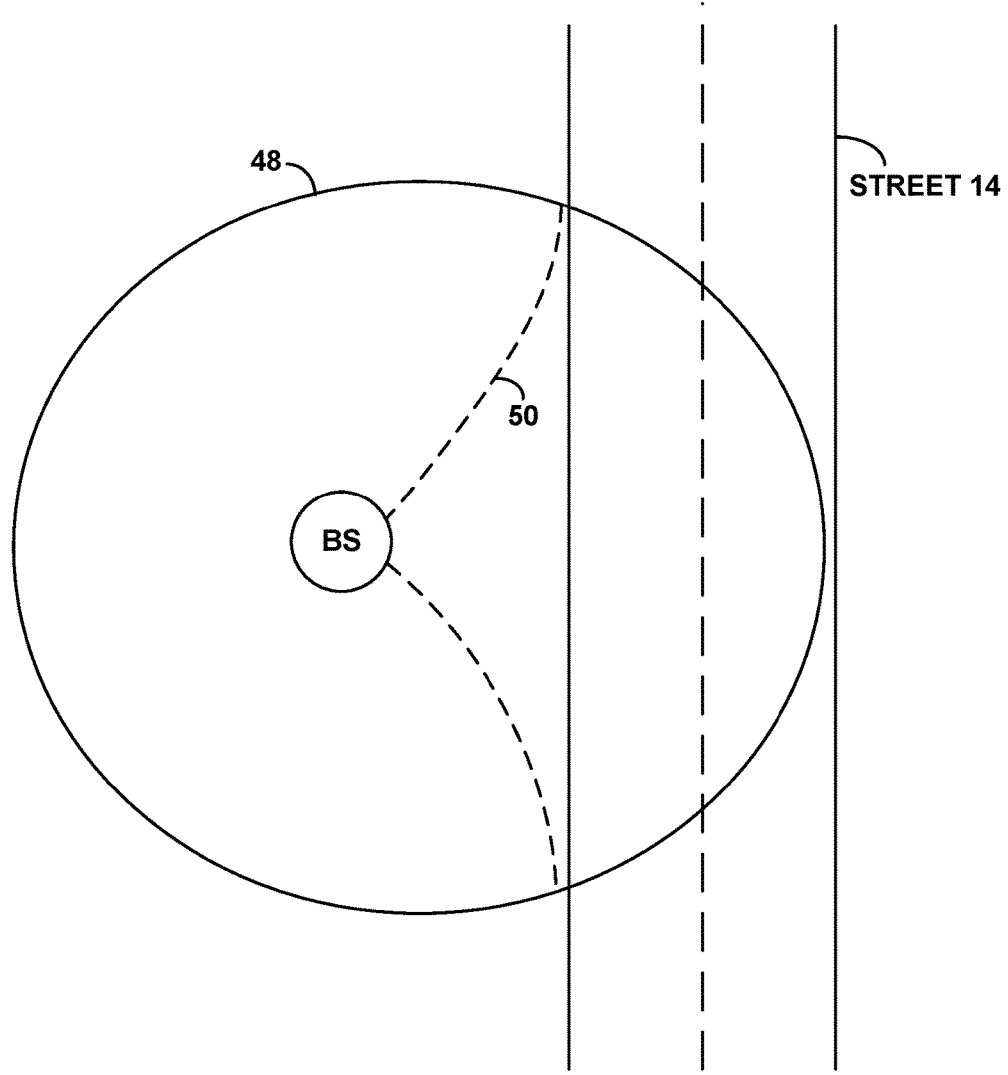
FIG. 4 is yet another depiction of an example change in base station antenna beam pattern to be directed to a predefined safe direction in response to detected public safety communication.

FIGS. 2-4 depict examples of such automatic changes in base station beam pattern in the example arrangement of FIG. 1, where the base station is directly adjacent to a street.

FIG. 2 is a side view depicting a default base station antenna beam pattern 40 having a down-tilt so as to provide ground-level cellular coverage that spans at least a portion of the street 14, and FIG. 2 then depicts a change of elevation of the base station antenna beam pattern by decreasing the down-tilt to provide a modified base station antenna beam pattern 42, directed more toward the horizon and less down to ground level. This change of elevation can help significantly reduce the strength of the cellular downlink at ground level and particularly on the street, thus helping to reduce or eliminate harmful interference at the first responder device on the street.

FIG. 3 is next a top view depicting a default base station antenna beam pattern 44 having an azimuth directed toward the street, and FIG. 3 then depicts a change of azimuth of the base station antenna beam pattern from a default direction 44 by rotating the azimuth to establish a modified direction 46 pointing away from the street. The figure shows the predefined safe direction thus being diametrically opposite to the default azimuth. But it is understood that the change of azimuth need not be as extreme but could still achieve reduction of downlink cellular signal strength on the street.

FIG. 4 is next also a top view depicting a default omni-directional base station antenna beam pattern, providing largely 360 degree coverage around the utility pole in the example arrangement. And FIG. 4 then depicts a change of the base station antenna beam pattern by introducing one or more nulls into the default beam pattern 48 at a predefined unsafe direction to establish a modification 50 of the beam pattern, thus effectively directing the beam pattern away from that predefined unsafe direction and effectively to a predefined safe direction. Here, the predefined unsafe direction is toward the street, and the predefined safe direction is away from the street.

As explained above, this automatic changing of the base station antenna beam pattern to be directed to a predefined safe direction in response to detecting communication on the public safety frequency channel can help quickly minimize or eliminate the possibility of harmful interference from the base station to public safety communication.

Once this quick change occurs, the RF sniffer may then further engage in a more specific process to help identify where the public safety communication is coming from, and the base station could further adjust its antenna beam pattern to help better ensure that the base station is not providing downlink cellular communication in the direction of the public safety communication.

In practice, for instance, after the RF sniffer signals to the base station to cause the base station to automatically change its antenna beam pattern to point to the safe direction, the RF sniffer could automatically test the energy level on the public safety frequency channel at various different beam directions and could determine at which direction the energy level is highest, or specifically at which direction the energy level is high enough to represent likely communication activity. The RF sniffer could then send a control signal to the base station, indicating the determined direction. And the base station could respond to that control signal by changing the base station antenna beam pattern further so as to specifically not point in the determined direction. For example, the base station could change the elevation and/or azimuth of its antenna beam pattern to point away from the determined direction or could introduce one or more nulls in its beam pattern pointing in the determined direction.

Still further, after causing the base station to change its antenna beam pattern, the RF sniffer could continue to regularly monitor for public safety communication on the public safety frequency channel and could determine when such communication is absent. For instance, the RF sniffer could determine when there is absence of such communication for at least a predefined period of time that is deemed to indicate the communication has ceased (e.g., the first responder device is no longer present or communicating). And the RF sniffer could respond to detecting the absence of the public safety communication by sending a further control signal to the base station to cause the base station to undo the change(s) to its antenna beam pattern, reverting to the base station's default antenna beam pattern.

Figure 5:
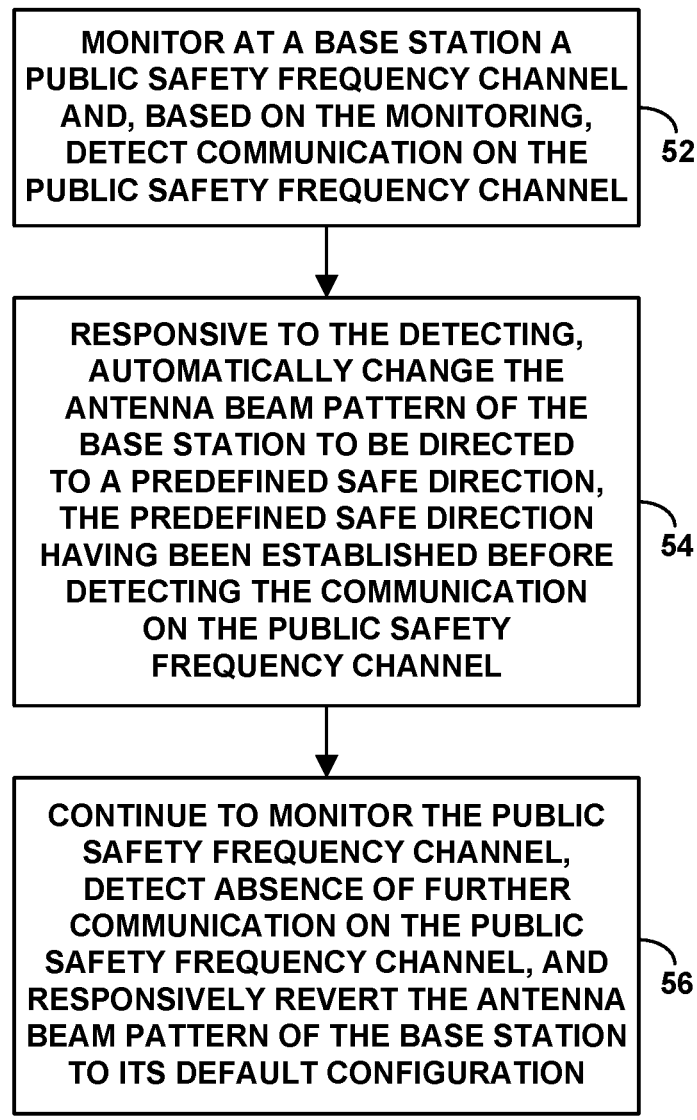
FIG. 5 is a flow chart depicting example operations that can be carried out in accordance with the disclosure.

FIG. 5 is next a flow chart depicting operations that can be carried out in line with the above discussion, to help control RF interference from a cellular base station to public safety communication, where the base station is configured to provide an antenna beam pattern. As shown in FIG. 5, at block 52, the operations include monitoring at the base station a public safety frequency channel and, based on the monitoring, detecting communication on the public safety frequency channel. This monitoring and detecting could be done at the base station by being done at a location largely co-located with the base station, such as at an RF sniffer that is co-located with the base station as discussed above. Alternatively, the monitoring and/or detecting could be carried out by the base station itself.

At block 54, the operations then include, responsive to the detecting, automatically changing the antenna beam pattern of the base station to be directed to a predefined safe direction, where the predefined safe direction is established before detecting the communication on the public safety frequency channel. And as noted above, the detecting of the communication on the public safety frequency channel could comprise detecting at least a predefined threshold level of energy on the public safety frequency channel, the predefined threshold level of energy indicating presence of communication on the public safety frequency channel. Further, the automatic changing of the antenna beam pattern is done as a direct result of the detecting.

In turn, at block 56, the operations include further monitoring the public safety frequency channel, detecting absence of further communication on the public safety frequency channel, and responding to the absence of further communication on the public safety frequency channel by reverting the antenna beam pattern of the base station to its default configuration.

As discussed above, the base station in this process could provide service on the antenna beam pattern on a cellular frequency channel, and the public safety frequency channel could occupy frequency that is at least adjacent to the cellular frequency channel.

Further, the act of changing the antenna beam pattern could take various forms. For example, the antenna beam pattern could have an elevation defining a down-tilt of the beam pattern, and automatically changing the beam pattern to be directed to the predefined safe direction could involve automatically increasing the elevation of the beam pattern and thus decreasing the down-tilt of the beam pattern. Alternatively or additionally, the antenna beam pattern could have an azimuth defining a radial direction of the beam pattern, and automatically changing the beam pattern to be directed to the predefined safe direction could involve automatically rotating the azimuth of the beam pattern.

Still further, as noted above, the act of automatically changing the antenna beam pattern to be directed to the predefined safe direction could involve automatically changing the beam pattern to be directed away from a predefined unsafe direction, such as by introducing one or more nulls into the beam pattern in the unsafe direction, and/or changing the elevation and/or azimuth of the beam pattern to point away from the predefined unsafe direction.

Yet further, as discussed above, the base station could be located adjacent to a street and could normally provide coverage on the street, and the act of automatically changing the beam pattern of the base station to be directed to the predefined safe direction could involve automatically changing the beam pattern to be directed away from the street or to be directed to a direction that is away from the street.

In addition, as discussed above, the operations could include, after automatically changing the beam pattern to be directed to the predefined safe direction, (i) detecting absence of communication on the public safety communication channel and (ii) responsive to detecting the absence of communication on the public safety communication channel, undoing the change to the beam pattern. And the operations could further include, automatically changing the beam pattern to be directed to the predefined safe direction, (i) detecting a direction from which communication on the public safety frequency channel arrives at the base station, such as by testing various directions to determine, as the direction, a direction at which a strongest communication on the public safety frequency channel arrives, and (ii) further changing the antenna beam pattern of the base station to be directed away from the determined direction.

Exemplary embodiments have been described. Those skilled in the art will understand, however, that changes and modifications may be made to these embodiments without departing from the true scope and spirit of the invention.

We claim:

1. A method for controlling radio frequency interference from a cellular base station to public safety communication, wherein the base station is configured to provide an antenna beam pattern, the method comprising:
   monitoring at the base station a public safety frequency channel and, based on the monitoring, detecting communication on the public safety frequency channel; and
   responsive to the detecting, automatically changing the antenna beam pattern of the base station to be directed to a predefined safe direction,
   wherein the predefined safe direction is established in advance of detecting the communication on the public safety frequency channel, wherein the base station is provisioned with an indication of the predefined safe direction, and wherein the predefined safe direction is a direction to which the antenna beam pattern should be automatically changed upon detecting nearby public safety communication.

2. The method of claim 1, wherein detecting the communication on the public safety frequency channel comprises detecting at least a predefined threshold level of energy on the public safety frequency channel, the predefined threshold level of energy indicating presence of communication on the public safety frequency channel.

3. The method of claim 1, wherein the base station provides service on the antenna beam pattern on a cellular frequency channel, and wherein the public safety frequency channel occupies frequency adjacent to the cellular frequency channel.

4. The method of claim 1, wherein the antenna beam pattern has an elevation defining a down-tilt of the beam pattern, and wherein automatically changing the beam pattern to be directed to the predefined safe direction comprises automatically increasing the elevation of the beam pattern and thus decreasing the down-tilt of the beam pattern.

5. The method of claim 4, wherein automatically increasing the elevation of the beam pattern comprises increasing the elevation of the beam pattern by an angle within a range from three to ninety degrees.

6. The method of claim 1, wherein the antenna beam pattern has an azimuth defining a radial direction of the beam pattern, and wherein automatically changing the beam pattern to be directed to the predefined safe direction comprises automatically rotating the azimuth of the beam pattern.

7. The method of claim 1, wherein automatically changing the antenna beam pattern to be directed to the predefined safe direction comprises automatically changing the beam pattern to be directed away from a predefined unsafe direction.

8. The method of claim 7, wherein automatically changing the beam pattern to be directed away from the predefined unsafe direction comprises automatically introducing one or more nulls into the beam pattern in the predefined unsafe direction.

9. The method of claim 1, wherein the base station is located adjacent to a street and normally provides coverage on the street, and wherein automatically changing the beam pattern of the base station to be directed to the predefined safe direction comprises automatically changing the beam pattern to be directed away from the street.

10. The method of claim 1, further comprising, after automatically changing the beam pattern to be directed to the predefined safe direction:
   detecting absence of communication on the public safety communication channel; and
   responsive to detecting the absence of communication on the public safety communication channel, undoing the change to the beam pattern.

11. The method of claim 1, further comprising, after automatically changing the beam pattern to be directed to the predefined safe direction:
   determining a direction from which communication on the public safety frequency channel arrives at the base station; and
   further changing the antenna beam pattern of the base station to be directed away from the determined direction.

12. The method of claim 11, wherein detecting the direction from which the communication on the public safety frequency channel arrives at the base station comprises:
   testing various directions to determine, as the direction, a direction at which a strongest communication on the public safety frequency channel arrives.

13. The method of claim 1, wherein the base station comprises a first antenna structure that the base station uses for providing cellular service, and wherein the monitoring at the base station the public safety frequency channel and detecting communication on the public safety frequency channel comprises using a second antenna structure spatially separated from the first antenna structure,
   whereby the spatial separation of the second antenna structure from the first antenna structure helps to avoid having transmission via the first antenna structure overpower reception by the second antenna structure.

14. A system for controlling radio frequency interference to public safety communication, the system comprising:
   a cellular base station including a first antenna structure and a first radio, wherein the cellular base station is configured to provide an antenna beam pattern for downlink cellular wireless communication service on a cellular wireless frequency channel, and wherein the base station is pre-provisioned with an indication of a predefined safe direction, the predefined safe direction being a direction to which the antenna beam pattern should be automatically changed upon detecting nearby public safety communication;
   a sniffer unit co-located with the cellular base station, the sniffer unit including a second antenna structure and a second radio, wherein the sniffer unit is configured to receive on a public safety frequency channel, to detect communication on the public safety frequency channel, and to output a control signal to the cellular base station upon detecting the communication on the public safety frequency channel,
   wherein the base station is configured to respond to the control signal from the sniffer unit by automatically changing the antenna beam pattern of the base station to be directed to the predefined safe direction, wherein the predefined safe direction is established in advance of detecting of the communication on the public safety frequency channel.

15. The system of claim 14, wherein the cellular base station and the sniffer unit are both mounted on a utility pole adjacent to a street,
   wherein the antenna beam pattern normally provides coverage on the street, and
   wherein automatically changing the beam pattern of the base station to be directed in the predefined safe direction comprises automatically changing the beam pattern to be directed away from the street.

16. The system of claim 14, wherein detecting the communication on the public safety frequency channel comprises detecting at least a predefined threshold level of energy on the public safety frequency channel, the predefined threshold level of energy indicating presence of communication on the public safety frequency channel.

17. The system of claim 14, wherein the antenna beam pattern has an elevation defining a down-tilt of the beam pattern, and wherein automatically changing the beam pattern to be directed to the predefined safe direction comprises automatically increasing the elevation of the beam pattern and thus decreasing the down-tilt of the beam pattern.

18. The system of claim 14, wherein the antenna beam pattern has an azimuth defining a radial direction of the beam pattern, and wherein automatically changing the beam pattern to be directed to the predefined safe direction comprises automatically rotating the azimuth of the beam pattern.

19. The system of claim 14, wherein automatically changing the antenna beam pattern to be directed to the predefined safe direction comprises automatically changing the beam pattern to be directed away from a predefined unsafe direction.

20. The system of claim 14, wherein the controller is further configured to refine the beam pattern after automatically changing the beam pattern to be directed to the predefined safe direction, wherein refining the beam pattern comprises (i) determining a direction from which communication on the public safety frequency channel arrives at the second antenna structure, and (ii) further changing the antenna beam pattern to be directed away from the determined direction.

\* \* \* \* \*